(12) United States Patent
Kalkbrenner et al.

(10) Patent No.: US 11,308,688 B2
(45) Date of Patent: Apr. 19, 2022

(54) SPECTRALLY-RESOLVING HIGH-RESOLUTION 3D LOCALIZATION MICROSCOPY

(71) Applicant: Carl Zeiss Microscopy GmbH, Jena (DE)

(72) Inventors: Thomas Kalkbrenner, Jena (DE); Michael Goelles, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 391 days.

(21) Appl. No.: 16/573,869

(22) Filed: Sep. 17, 2019

(65) Prior Publication Data
US 2020/0090399 A1 Mar. 19, 2020

(30) Foreign Application Priority Data
Sep. 17, 2018 (DE) .......................... 102018122652.7

(51) Int. Cl.
*G02B 21/00* (2006.01)
*G06T 17/00* (2006.01)
(Continued)

(52) U.S. Cl.
CPC .......... *G06T 17/00* (2013.01); *G01N 21/6458* (2013.01); *G02B 21/008* (2013.01); *G02B 21/06* (2013.01); *G02B 21/361* (2013.01)

(58) Field of Classification Search
CPC ...... G06T 17/00; G02B 21/008; G02B 21/06; G02B 21/361; G02B 21/00;
(Continued)

(56) References Cited

U.S. PATENT DOCUMENTS 6,307,618 B1 * 10/2001 Suzuki ................ G03F 7/70308
355/53
8,760,618 B2 * 6/2014 Sumiyoshi ............. G03B 27/68
355/52
(Continued)

FOREIGN PATENT DOCUMENTS

DE  10 2006 021 317 B3  10/2007
DE  10 2009 060 490 A1   6/2011
(Continued)

OTHER PUBLICATIONS

Li, Yiming, et al., "Fast, robust and precise 3D localization for arbitrary point spread functions," bioRxiv, doi: http://dx.doi.org/10.1101/172643, 16 pages (Aug. 8, 2017).
(Continued)

*Primary Examiner* — Arnel C Lavarias
(74) *Attorney, Agent, or Firm* — Christensen, Fonder, Dardi & Herbert PLLC (57) ABSTRACT

A localization microscope including an imaging device emitting sample light from a focal plane into an image plane, including an optical-manipulation device for depth-dependent influencing of a point-spread function of the imaging and influencing the point-spread function of the imaging such that a point emitter is imaged in the image plane into an image that is rotationally asymmetrically distorted. A form of the distortion depends on the location of the point emitter with respect to the focal plane and a wavelength of the sample light. The optical manipulation device includes first and second anisotropy elements that anisotropically influence the point spread function to produce rotational asymmetry of the point emitter image. The elements are arranged one behind the other in the imaging direction, with anisotropy axes at an angle to one another. Both elements
(Continued)

have differing neutral wavelength at which they do not anisotropically influence the point spread.

16 Claims, 4 Drawing Sheets

(51) Int. Cl.
    *G02B 21/06*     (2006.01)
    *G01N 21/64*     (2006.01)
    *G02B 21/36*     (2006.01)

(58) Field of Classification Search
    CPC .............. G02B 21/0004; G02B 21/002; G02B 21/0032; G02B 21/0052; G02B 21/006; G02B 21/0064; G02B 21/0076; G02B 21/36; G01N 21/6458; G01N 21/6456; G01N 2021/6463; G01N 21/6428
    USPC .................................. 359/368, 362, 363, 369
    See application file for complete search history.

(56) References Cited

U.S. PATENT DOCUMENTS

| | | |
|---|---|---|
| 2008/0068588 A1 | 3/2008 | Hess et al. |
| 2009/0134342 A1 | 5/2009 | Hell et al. |
| 2013/0120539 A1 | 5/2013 | Foelling |
| 2013/0155218 A1 | 6/2013 | Kalkbrenner et al. |
| 2013/0222567 A1 | 8/2013 | Kalkbrenner et al. |
| 2013/0300833 A1 | 11/2013 | Soeller et al. |
| 2014/0176678 A1 | 6/2014 | Novikau et al. |
| 2015/0002632 A1* | 1/2015 | Kalkbrenner .......... G01N 21/64 348/46 |
| 2017/0343824 A1 | 11/2017 | Sinha et al. |

FOREIGN PATENT DOCUMENTS

| | | |
|---|---|---|
| DE | 10 2011 055 294 A1 | 5/2013 |
| DE | 10 2012 200 344 A1 | 7/2013 |
| DE | 10 2012 201 286 A1 | 8/2013 |
| DE | 10 2012 224 306 A1 | 6/2014 |
| JP | 2004093280 A * | 3/2004 .......... G01R 33/032 |
| WO | WO 2006/127692 A2 | 11/2006 |
| WO | WO 2012/039636 A2 | 3/2012 |

OTHER PUBLICATIONS

Baddeley, David, et al., "Three-Dimensional Sub-100 nm Super-Resolution Imaging of Biological Samples Using a Phase Ramp in the Objective Pupil," *Nano Research*, vol. 4, No. 6, pp. 589-598 (2011).

Juette, Manuel F., et al., "Three-dimensional sub-100 nm resolution fluorescence microscopy of thick samples," *Nature Methods*, vol. 5, No. 6, 3 pages (Jun. 2008).

Juette, Manuel F., et al. "Three-dimensional sub-100 nm resolution fluorescence microscopy of thick samples," *Nature Methods*, vol. 5 No. 6—Supplementary figures and text, 11 pages (Jun. 2008).

Pavani, Sri Rama Prasanna, et al., "Three-dimensional, single-molecule fluorescence imaging beyond the diffraction limit by using a double-helix point spread function," *PNAS*, vol. 106, No. 9, pp. 2295-2999 (Mar. 3, 2009).

* cited by examiner

SPECTRALLY-RESOLVING HIGH-RESOLUTION 3D LOCALIZATION MICROSCOPY

PRIORITY CLAIM

The present application claims priority to German Patent Application No. 10 2018 122 652.7, filed on Sep. 17, 2018, which said application is incorporated by reference in its entirety herein.

FIELD OF THE INVENTION

The invention relates to a localization microscope, comprising an imaging device for imaging a sample, which emits sample light, from a focal plane into an image plane, wherein the imaging device comprises an optical manipulation device that is configured for the depth-dependent influencing of a point spread function of the imaging and influences the point spread function of the imaging such that a point emitter is imaged in the image plane into a point emitter image that has at least two image lobes, wherein the relative locations of the image lobes of the point emitter image are dependent on the location of the point emitter with respect to the focal plane and a wavelength of the sample light, and wherein the optical manipulation device comprises a first and a second anisotropy element that anisotropically influence in each case the point spread function of the imaging to produce the image lobes of the point emitter image and in each case comprise an anisotropy axis.

The invention furthermore relates to a method for localization microscopy, wherein a sample, which emits sample light, is imaged from a focal plane into an image plane, wherein a point spread function of the imaging is influenced in a depth-dependent fashion using an optical manipulation device such that a point emitter is imaged in the image plane into a point emitter image that has at least two image lobes, wherein the relative locations of the image lobes of the point emitter image are dependent on the location of the point emitter with respect to the focal plane and a wavelength of the sample light, and wherein a first and a second anisotropy element are used in the optical manipulation device that anisotropically influence in each case the point spread function of the imaging to produce the image lobes of the point emitter image and in each case comprise an anisotropy axis.

BACKGROUND OF THE INVENTION

Various methods for overcoming the diffraction limit in microscopy have been developed in the prior art. WO 2006/127692 or DE 102006021317 A1 disclose a method that is abbreviated to PALM (photo activated light microscopy); it uses a labeling substance for imaging a sample that can be activated for example using optical radiation. Only in the activated state can the labeling substance emit specific fluorescence radiation. Non-activated molecules of the labeling substance do not emit any or at least no notable fluorescence radiation even after being irradiated with excitation radiation. The activation radiation is therefore generally referred to as the switching signal. The switching signal in the PALM method is applied such that at least a specific portion of the activated labeling molecules are arranged at a distance from neighboring activated molecules such that these labeling molecules are separated, measured by the optical resolution of the microscopy, or can be separated subsequently by image processing methods. It is said that at least one subset of the fluorescence emitters is isolated. Consequently, the term "isolated" relates to the optical resolution of the imaging. After recording the sample light, for said isolated emitters, the center of their radiation distribution which is due to resolution limits is ascertained. The location of the emitters can be determined therefrom computationally with a higher accuracy than the optical resolution itself allows. This procedure is referred to as localization step. The increased resolution by computational determination of the centroid of the diffraction distribution is also referred to as "superresolution" in English technical literature. It requires that at least one subset of the activated emitters in the sample is distinguishable with the optical resolution, i.e. are isolated. Their position can then be determined with greater accuracy; they can be localized. Since high resolution is obtained by computational localization of the sites of emitters emitting sample light, the term "localization microscopy" has become widespread for this type of microscopy, which was developed further in different directions and even for emitters that are to be isolated without switching signal.

Some developments relate to attaining a three-dimensional resolution, that is to say a resolution not just in the lateral direction, as explained in WO2006/127692, but also in the depth direction. DE 102009060490, DE 102012200344 and DE 102012224306 should be mentioned in this respect. For three-dimensional localization microscopy, the point spread function must be modified so as to code the position of an emitter emitting sample light in the depth direction in the image, too, by a lateral property of the emitter image.

WO 2012/039636 A2 in this respect discloses a localization microscope and a method for localization microscopy of the type mentioned in the introductory part. Therein, a phase manipulation is performed in a pupil plane in that two opposite phase ramps ensure that each point emitter image, that is to say the imaging of an isolated point emitter, has two image lobes. These image lobes are displaced relative to one another in dependence on the depth location, that is to say the z-position of the point emitter.

This approach becomes problematic when a spectral resolution is required. The latter is frequently necessary in fluorescence microscopy because it is generally not usually possible to make functional statements in cell biology, which is the main field of use of high resolution, with a single fluorescence stain. Classically, that is to say with normal resolution, multi-color imaging is realized either by rapid sequential imaging in different color channels, e.g. by way of a suitable fast filter change etc., or with a color splitter in the detection beam path and a dedicated detector per color channel. However, either is disadvantageous or unusable for localization microscopy. Since localization microscopy requires time series of up to 100 000 frames, the sequential approach would take a very long time. In addition, no dynamic processes could be investigated because the recordings in the color channels inherently cannot be simultaneous. Color splitting in the detection channel would avoid this problem, but requires a highly complex detector for each color channel. In addition, the detectors must be adjusted with pixel accuracy in relation to one another.

For only two-dimensional localization microscopy, the detection of a plurality of colors is known. To this end, the point spread function is influenced such that it does not code the depth location, as in the 3D localization microscopy mentioned in the introductory part, but rather the color information. This is realized in DE 102012201286 A1 for example.

In order to obtain a three-dimensional resolution and a spectral resolution, the point spread function must be influenced, i.e., coded, both with respect to the depth location of the emitters and with respect to the spectral information. WO 2012/039636 A2, which was already mentioned, here offers an approach in which pupil division is used. A phase-manipulating element for the depth resolution, that is to say 3D localization microscopy, is placed on a half pupil, and an emission filter is placed in the other pupil half. However, this embodiment, which is shown in WO 2012/039636 A2 in FIG. 14, has two disadvantages. The emission filter is a spectral-select element. It inherently always leads to suppression of photons and consequently in localization microscopy, which is particularly photon-sensitive, either to a worse resolution or a much longer measurement. The intensity between the image lobes for different wavelengths furthermore becomes very unequal. It is possible to achieve equal intensity of the image lobes only for a single wavelength. This additionally makes three-dimensional localization more difficult, which becomes worse as a result.

SUMMARY OF THE INVENTION

For this reason, the invention is based on the object of specifying a localization microscope and method for localization microscopy in which no photons are spectrally suppressed and yet both spectral resolution and depth resolution are achievable.

The localization microscope has an imaging device for imaging a sample which emits sample light. The sample can be, for example, a fluorescent sample that was appropriately excited. The sample is imaged from a focal plane into an image plane.

The imaging device has an optical manipulation device. The latter is configured for the depth-dependent wavelength-dependent influencing of the point spread function of the imaging. It influences the point spread function of the imaging (also "PSF" below) in a manner such that a point emitter is imaged onto a point emitter image that is rotationally asymmetrically distorted, for example has at least two image lobes. The anisotropic distortion of the point emitter image depends on the location of the point emitter with respect to the focal plane and on a wavelength of the sample light.

According to the invention, in one embodiment, the rotational asymmetry is the image lobes, and the configuration is the relative location thereof. The image lobes then have dependent relative locations with respect to one another both depending on their location with respect to the focal plane and on the wavelength of the sample light. A further embodiment of the rotational asymmetry is an anisotropic distortion of the point emitter image.

The optical manipulation device has a first and second anisotropy element. Each anisotropy element anisotropically influences the point spread function of the imaging and produces the anisotropic distortion. It is also embodied as an anisotropic distortion element. During imaging, as the term "localization microscopy" implies, it is ensured that isolated emitters are present in the sample that emit the sample light.

Each anisotropy element is characterized by an anisotropy axis. The two anisotropy elements are arranged one behind the other in the imaging direction. Their anisotropy axes are non-parallel with respect to one another. The angle enclosed by the anisotropy axes depends in embodiments on the realization of the anisotropy elements, but the anisotropy axes are generally located at a right angle with respect to one another.

Each first anisotropy element anisotropically influences the point spread function, but is neutral for a first wavelength. The reverse is the case for the second anisotropy element. It likewise anisotropically influences the point spread function, but is neutral for a second wavelength. This can be understood as meaning that each anisotropy element is neutral for an individual wavelength that is assigned thereto. The anisotropy elements thus differ in terms of the location of their anisotropy axes and in their neutral wavelengths. In this way, the orientation and/or form of the distortion is not only depth-dependent, but also wavelength-dependent.

The method for localization microscopy is realized analogously. A sample which emits sample light is imaged from a focal plane into an image plane. A point spread function of said imaging is influenced in a depth-dependent fashion using an optical manipulation device such that a point emitter is imaged into a point emitter image that is anisotropically distorted. The configuration of the anisotropic distortion depends on the location of the point emitter with respect to the focal plane and on a wavelength of the sample light. The optical manipulation device comprises a first and a second anisotropy element that anisotropically influence in each case the point spread function of the imaging in order to produce the anisotropic distortion. Each anisotropy element is characterized by its anisotropy axis. The two anisotropy elements are located one behind the other in the imaging direction and their anisotropy axes enclose an angle between them. The two anisotropy elements do not act on the first and second wavelength, respectively.

By arranging the anisotropy elements one behind the other and on account of the angle their anisotropy axes enclose, in combination with the fact that the anisotropy elements are neutral for different wavelengths for the point spread function, it is ensured that the anisotropic distortions for the first wavelength and the second wavelength in the image plane have a structure that extends for example along different structure axes, because only one of the anisotropy elements acts there. In this way, it is possible to decode the wavelength from the structure axis direction. The relative location of elements of the anisotropically distorted point emitter image codes the depth location for said color channel.

The occurrence of anisotropic distortions in a conventional wide-field microscope would be highly disturbing; no usable imaging would be obtained. However, this is not a problem in localization microscopy because at least some of the point emitters emitting into the sample light are isolated, as the term localization microscopy implies. The production of the anisotropic distortion that in conventional wide-field microscopy would have the effect of unacceptable image smear is now non-critical and can be evaluated in the localization step not only with respect to the lateral site indication of the corresponding point emitter but especially also with respect to the depth indication for the point emitter and color channel for the point emitter. To this end, the form and/or orientation of the distortion, for example a relative location of elements of the point emitter image (for example image lobes), is captured. The center of the distortion indicates the lateral coordinate of the point emitter. The orientation and/or form of the z-coordinate codes the color channel in which the sample light was emitted by the corresponding point emitter.

For this evaluation, the microscope generally comprises a corresponding evaluation device, which can be realized for example as a computer. The evaluation can be performed online, that is to say directly upon generation of each frame, or alternatively after a multiplicity of frames have been recorded. This is generally known from localization microscopy, although not for the combination of lateral location determination in the image, depth indication and color channel.

Structure axes of the anisotropic distortion of the point emitter image are generally present when an emitter emits the sample light exactly at one of the wavelengths. However, cases in which emitters emit the sample light at a wavelength that lies between the two neutral wavelengths are also possible. The point emitter image then represents with respect to its form a mixture or transitional form of the point emitter image at the first wavelength having a first structure axis and of the point emitter image at the second wavelength having the second structure axis. This form can be distinguished from the forms (referred to as pure forms) at the first and second wavelength, which means that ultimately in a general formulation the form of the point emitter image codes both the depth and the wavelength. In this way, it is also possible with two anisotropy elements to realize more than two color channels.

In a simple configuration, the anisotropy elements can in each case be in the form of phase elements. The anisotropic distortion then has the form of at least two image lobes. Each phase element has an effect influencing the PSF, but not at its individual wavelength, that is to say it is neutral there for the PSF. In this way, each anisotropy element does not produce the image lobes at the radiation of the neutral wavelength. Generally, the anisotropy element has a function that influences the PSF, that is to say produces the image lobes, in all wavelengths outside its neutral wavelength. This is admissible and even permits, as explained, the increase in the number of color channels as long as the anisotropy element has no phase-influencing effect at a wavelength, that is to say is neutral, whereas the other anisotropy element distorts there. It is therefore expedient to effectively characterize the anisotropy element by its (lack of) effect at the neutral wavelength, which can then be interpreted as the wavelength of the other anisotropy element that is not neutral there.

A particularly simple configuration of a phase element for realizing one of the anisotropy elements consists of a wedge pair of two glasses with different dispersion properties that are selected such that the total refractive index of the wedge pair disappears at the neutral wavelength. The two glasses thus cancel each other out with respect to their dispersive effect for the neutral wavelength. Otherwise, and in particular at the neutral wavelength that is assigned to the respective wedge pair, they have a dispersive effect and thus produce the image lobes.

Wedge angle and refractive indices of the wedge pair are selected such that the neutral wavelength is transmitted without deflection. Shorter or longer wavelengths undergo deflection. The fact that the wedge pairs are crossed causes the desired differentiation both with respect to the depth and with respect to the color channel. The advantage of this approach is that glasses which are technologically manageable very easily can be used because two parameters can be varied for realizing the wedge pair, specifically the wedge angle and the refractive index of the respective wedge in the wedge pair. Overall, this makes available four parameters, two refractive indices and two wedge angles. In a particularly simple configuration, the wedge angles are here selected such that the wedge pair has parallel external faces, that is to say the entrance face of the phase element is parallel to the exit face. The wedge angles are then in equal opposition and add up to zero.

For phase elements, it is to be preferred for the anisotropy axes to be arranged at an angle of between 80 and 90°, preferably of 90° with respect to one another.

For the purposes of the invention, phase elements moreover have their best effect when they are arranged in a pupil plane of the detection beam path through which the sample light is imaged into the point emitter images. The arrangement in or near a pupil plane, for example the objective pupil plane, is therefore preferred.

A further alternative for the anisotropy elements are anisotropy lenses which are neutral at one wavelength and otherwise have anisotropy over the remaining spectral range. The anisotropic distortion is then a longitudinal distortion of the point emitter image. The anisotropy axes in this case are characterized by the cylinder axis of the anisotropy lenses. They are preferably located at an angle of between 35 and 55°, with particular preference at 45° with respect to one another.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention will be explained in more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times. In the figures.

DETAILED DESCRIPTION

Figure 1:
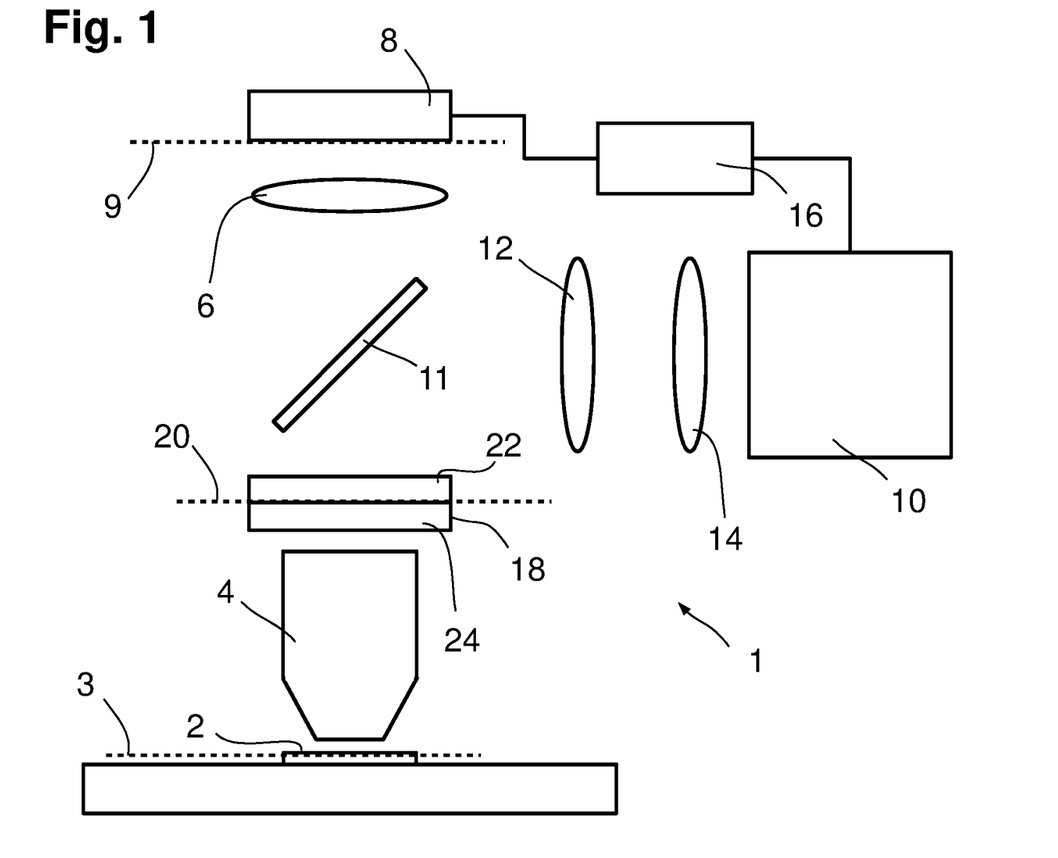
FIG. 1 shows a schematic illustration of a localization microscope.

FIG. 1 shows a microscope 1, configured for the aforementioned localization microscopy. It images a sample 2, located in a focal plane 3, onto a detector 8, for example a camera located in an image plane 9, using an objective 4 via a tube lens 6. The entire imaging is performed in widefield. The sample 2 is to this end illuminated by an illumination source 10 that directs corresponding illumination radiation onto the sample 2 via a beam splitter 11 and the objective 4. An illumination optical unit 12, 14, the realization of which is not important here, conditions the illumination radiation from the illumination source 10. The entire microscope is controlled by a control device 16, which may be configured for example as a computer, for localization microscopy. In localization microscopy, it is known that the sample 2 is prepared such that isolated emitters emit sample light. The term "isolation" here refers to the fact that the sample 2 contains emitters that can be distinguished in the image plane 9 by the optical resolution which is ultimately determined by the objective 4 and the tube lens 6. With respect to localization microscopy, reference is made to the introductory part of the description and to the general description of the invention, as stated above.

The microscope 1 differs from conventional localization microscopes in that an optical manipulation element 18 is provided that is located in a pupil plane 20 in the embodiment of FIG. 1. In the embodiment shown, this is the rear-side pupil plane of the objective 4. However, this is not mandatory. If need be, the pupil plane 20 could also be produced by imaging optical units that are arranged therebetween. In that case, it would be a pupil plane that is conjugate to the rear-side pupil plane of the objective 4. It can also be located only in the imaging beam path.

The manipulation element 18 influences the point spread function according to which the sample 2 is imaged into the image plane 9 in a manner such that a point emitter image of a point-shaped emitter is anisotropically distorted. The distortion results in the point emitter image being rotationally asymmetric, that is to say generally that it has an anisotropy axis and for example image lobes that are rotationally asymmetrical. In order to then realize, in addition to a depth resolution, at least two color channels, that is to say to distinguish between at least two spectral ranges for the sample light, the manipulation element is made up of two parts from two anisotropy elements 22 and 24. These are arranged located one behind the other in the imaging direction, that is to say from the objective 4 to the detector 8. In FIG. 1, the thickness of these anisotropy elements 22, 24 is highly exaggerated. In reality, they are de facto located in the pupil plane 20. Each anisotropy element produces the anisotropic image distortion. However, each anisotropy element 22, 24 has a neutral wavelength at which it does not produce image distortion. The neutral wavelengths of the anisotropy elements 22, 24 differ. Furthermore, each anisotropy element 22, 24 has an individual anisotropy axis. The anisotropy axes of the anisotropy elements 22, 24 are arranged at an angle to one another, that is to say they are not parallel. The effect of these two anisotropy elements will be explained below with reference to FIGS. 4A to 4D.

Figure 2:
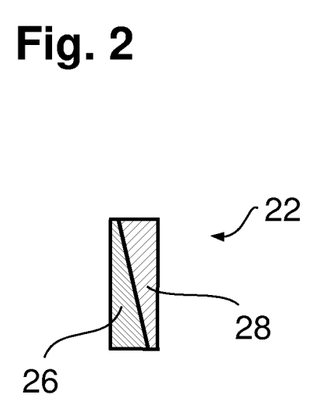
FIGS. 2 and 3 show section illustrations of various optical manipulation elements that are used in the microscope of FIG. 1, FIGS. 4A to 4D show illustrations for explaining the effect of the optical manipulation element.
Figure 3:
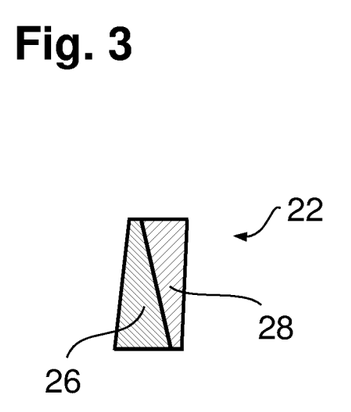

One possible construction is illustrated in FIGS. 2 and 3 by way of example for the anisotropy element 22. The anisotropy element 22 here consists of two glass wedges 26, 28, which in the embodiment of FIG. 2 are configured such that they form parallel end faces of the anisotropy element 22. The glass wedges differ in terms of the glasses used. They are selected such that the refractive indices of the glasses are the same at the neutral wavelength and otherwise differ. In this way, such a glass wedge acts in a phase-influencing manner at every wavelength outside the neutral wavelength in the sense of the desired PSF distortion for depth coding and produces the rotationally asymmetric, that is to say anisotropic, distortion in the point emitter image. If two glass wedges that are situated in a manner inverted with respect to their wedge directions in the halves of the pupil 20 are used, a point emitter image that consists of two image lobes is produced for all wavelengths outside the neutral wavelength. If the emitter is located in the focal plane 3, the image lobes are located on one axis. They are offset perpendicularly to said axis when the point emitter is located above or below the focal plane 3. The offset is unique to the extent that it is possible to differentiate whether an emitter is situated above or below the focal plane. The direction of the axis in the image is uniquely determined by the direction along which the inclined faces of the wedges are oriented.

The anisotropy element 24 is the same as the anisotropy element 22 except for two differences. First, the glasses differ and are selected such that the neutral wavelength is a different one. Second, the wedge direction of the glass wedge pair 22 and thus the anisotropy axis is rotated with respect to the wedge direction of the glass wedge pair 24, preferably by 90°. For adjustment reasons, the value can fluctuate between 85° and 105°. The wedge direction is here understood to be that direction along which the wedge faces ascend or slope down.

FIG. 2 shows the case of a plane-parallel double wedge purely as an example of the anisotropy element 22. Except for the natural wavelength (and of course the arrangement in the beam path), the anisotropy element 24 corresponds to the element 22. In FIG. 3, the element 22/24 is modified in a manner such that the entrance face and the exit face of the wedge pair are not parallel with respect to one another. In this case, the neutral wavelength does not occur at the value at which the refractive indices of the glass wedges 26 and 28 are identical, but at a different wavelength that is situated such that the refractive index difference between the glass wedges 26 and 28 ensures that said sample light is merely offset but does not propagate in a different direction. The approach of FIG. 3 offers greater freedom in the selection of the wedge angles and glass materials, that is to say the refractive indices.

Figure 4A:
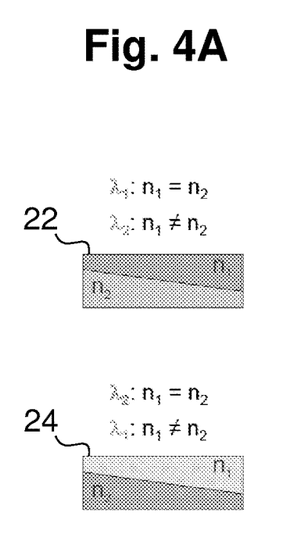

FIGS. 4A to 4D show the effect of the two anisotropy elements 22, 24, here in the form of the glass wedge pair as per FIG. 2. FIG. 4A shows the two glass wedge pairs in sectional illustration, with the neutral wavelengths differing in the drawing. In the case of the glass wedge pair 22, $\lambda_1$ is the neutral wavelength. Here, the refractive indices are the same and the sample light is not deflected into a different direction. In the case of the glass wedge pair 24, $\lambda_2$ is the neutral wavelength.

Figure 4B:
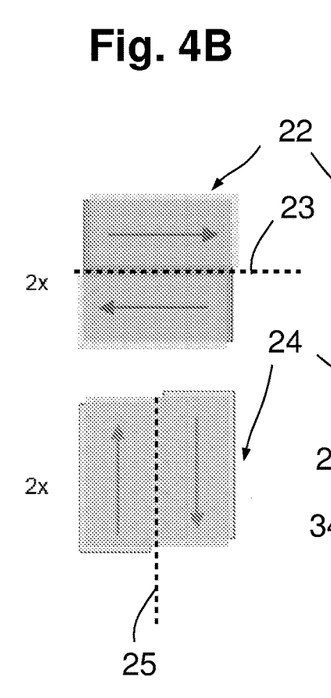
Figure 4C:
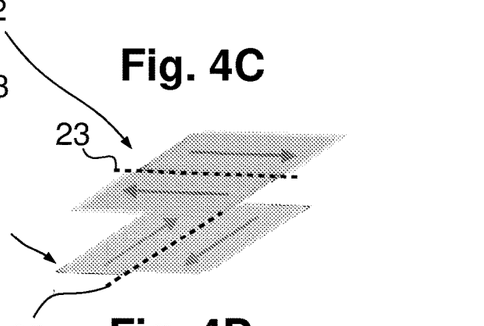

FIG. 4B shows in each case in plan view how the glass wedges 22, 24 are located on the pupil plane. FIG. 4B shows the anisotropy element 22 in the upper illustration and the anisotropy element 24 in the lower illustration. It is apparent that two glass wedge pairs are placed into the halves of the pupil, with the wedge directions in the pupil halves being inverted in relation to one another. Both glass wedges extend along an axis 23, which is the anisotropy axis. The anisotropy element 24, on the other hand, is formed by the two glass wedge pairs that are arranged similarly, but with the anisotropy axis 25 being rotated by 90°. FIG. 4C shows how the anisotropy elements 22, 24 with crossed anisotropy axes 23, 25 are ultimately situated one behind the other in the imaging direction.

Figure 4D:
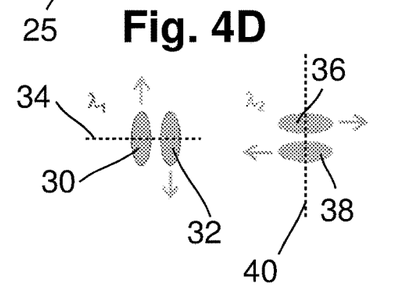

FIG. 4D shows the effect that is caused thereby, specifically in a left illustration for the wavelength $\lambda_1$ and in a right illustration for the wavelength $\lambda_2$. At $\lambda_1$, only the anisotropy element 24 is effective because the element 22 is neutral here. The exact opposite is true at $\lambda_2$. The "pure form" of the distortion occurs when the point emitter image is divided into two image lobes 30, 32 and 36, 38, which are displaced with respect to one another along structure axes 34 and 40 when a point emitter is imagined to be displaced along the depth direction, that is to say the z-axis. In reality of course no distortion occurs, because the point emitters are locationally fixed. In addition, the pure forms are obtained only when the sample light of the point emitter is emitted at the corresponding wavelength $\lambda_1$ or $\lambda_2$. For this reason, the structure axis 34 is specified by the orientation of the anisotropy axis 25 at the wavelength $\lambda_1$. In contrast, the anisotropy element 24 is neutral at the wavelength $\lambda_2$, and only the anisotropy element 22 is effective—with the effect that the structure axis 40 is defined by the anisotropy axis 23.

In this way, it is not only possible for the depth location, which is coded by the offset along the structure axis 34 or 38, but also for the wavelength, which is coded by the direction of the structure axis 34, 38, to be decoded from the rotationally asymmetrically distorted point emitter image, in this case consisting of the image lobes 30 and 32. This is made possible by the control device 16.

Figure 5:
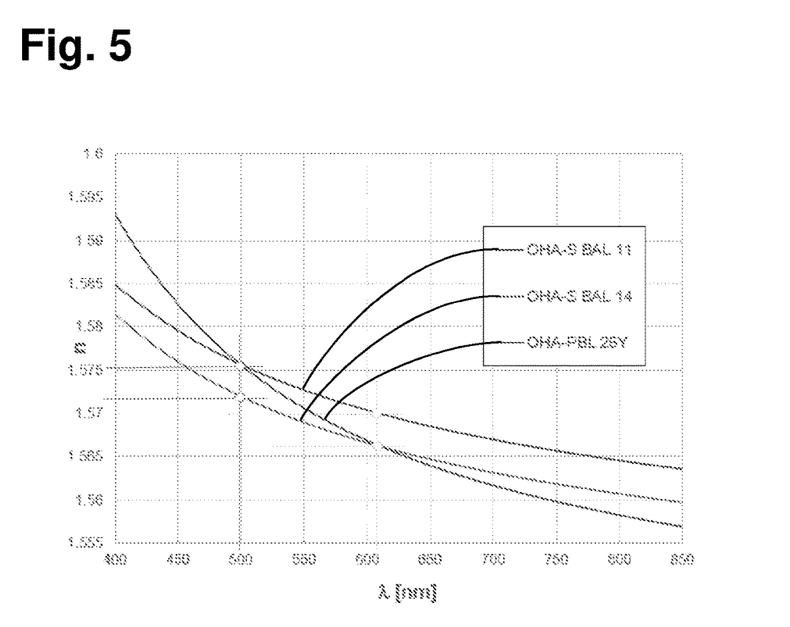
FIG. 5 shows dispersion curves for glasses that can be used in the manipulation element of FIGS. 4A to 4D, FIGS. 6A-6H and 6J show distortions a point emitter image in the microscope of FIG. 1 can have for different wavelengths and depth locations of the point emitter in localization microscopy.

FIG. 5 shows by way of example how the glasses can be selected. Dispersion curves for three different glasses are plotted, which are designated in the legend. It is easy to see that it is easy to find glass pair combinations that have the same refractive index at a specific wavelength (that is to say can be combined neutrally), but differ at a different wavelength. One possible combination would be the glass pair OHA-S BAL 11 and OHA-S BAL 14 for example. At the wavelength of approximately 500 nm, they have the same refractive index, but a highly different refractive index at a wavelength of approximately 610 nm. This could be used for example in the anisotropy element 22. A configuration of the anisotropy element 24 with the glass pair OHA-S BAL 14 and OHA-PDL 26Y would complement the former. This class pair would have the same refractive index at the wavelength 610 nm, but a different refractive index at approximately 500 nm. In this way, the neutral wavelengths of the wedge pairs with this glass selection would differ and it would be possible to exactly achieve the distortion according to FIG. 4D, wherein the wavelengths $\lambda_1$ and $\lambda_2$ would then be approximately 500 nm and 610 nm.

Figure 6A:
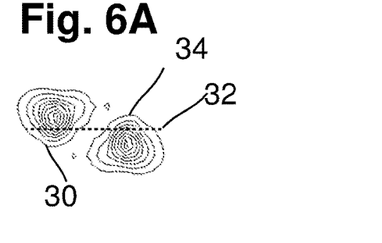
Figure 6B:
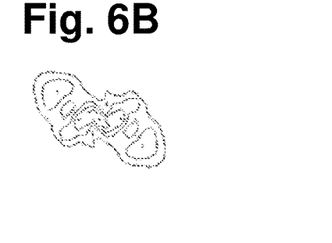
Figure 6C:
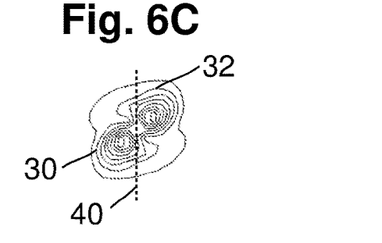
Figure 6D:
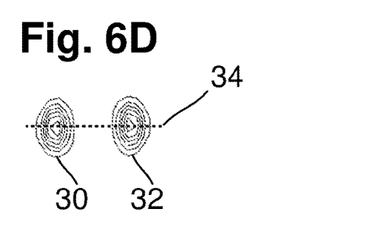
Figure 6E:
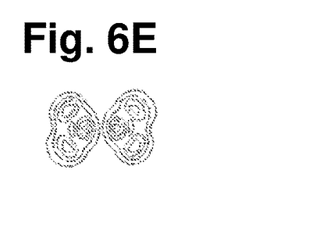
Figure 6F:
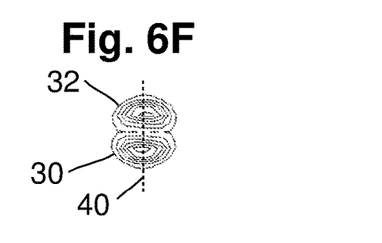
Figure 6G:
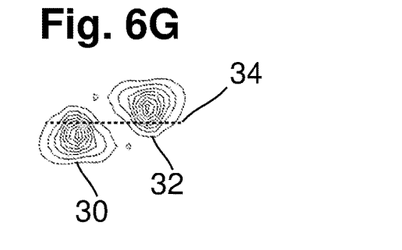
Figure 6H:
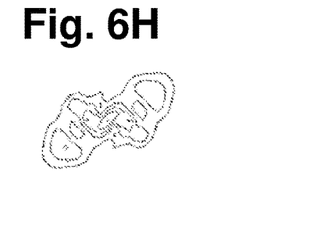
Figure 6J:
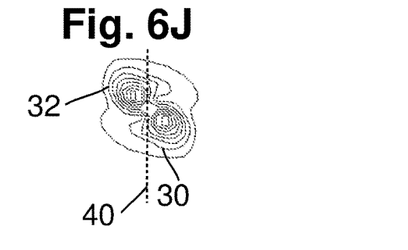

FIGS. 6A to 6J show distortions that come about in the form of two image lobes 30, 32 for different situations. In FIGS. 6D, 6E and 6F, the point emitters are located in each case in the focal plane 3, but in FIGS. 6A, 6B and 6C they are located thereabove, and in FIGS. 6G, 6H and 6J, they are located below it. In FIGS. 6A, 6D and 6G, the emitter emits sample light only at the wavelength $\lambda_1$. In FIGS. 6C, 6F and 6J, on the other hand, the emitter emits only at $\lambda_2$. In FIGS. 6B, 6E and 6H, the wavelength of the sample light emitted by the point emitter lies between $\lambda_1$ and $\lambda_2$.

As can be seen, the distortion, that is to say the orientation of the image lobes 30, 32, in FIGS. 6D and 6F unfolds only along the structure axes 34, 38, which are specified by the anisotropy axes 23, 25. In FIGS. 6A, 6C, 6G and 6J, the image lobes are orthogonally displaced with respect to said structure axes 34, 38. Consequently, it is possible to code the color channel from the direction of the structure axes 34, 38 and the depth location from the offset relative to the structure axes 34, 38. The same is also true for a point emitter that neither has the pure wavelength $\lambda_1$ nor $\lambda_2$, that is to say produces the point emitter images 6B, 6E and 6H. They can be distinguished from the "pure" forms and thus be classified with respect to color channel and depth.

Figure 7:
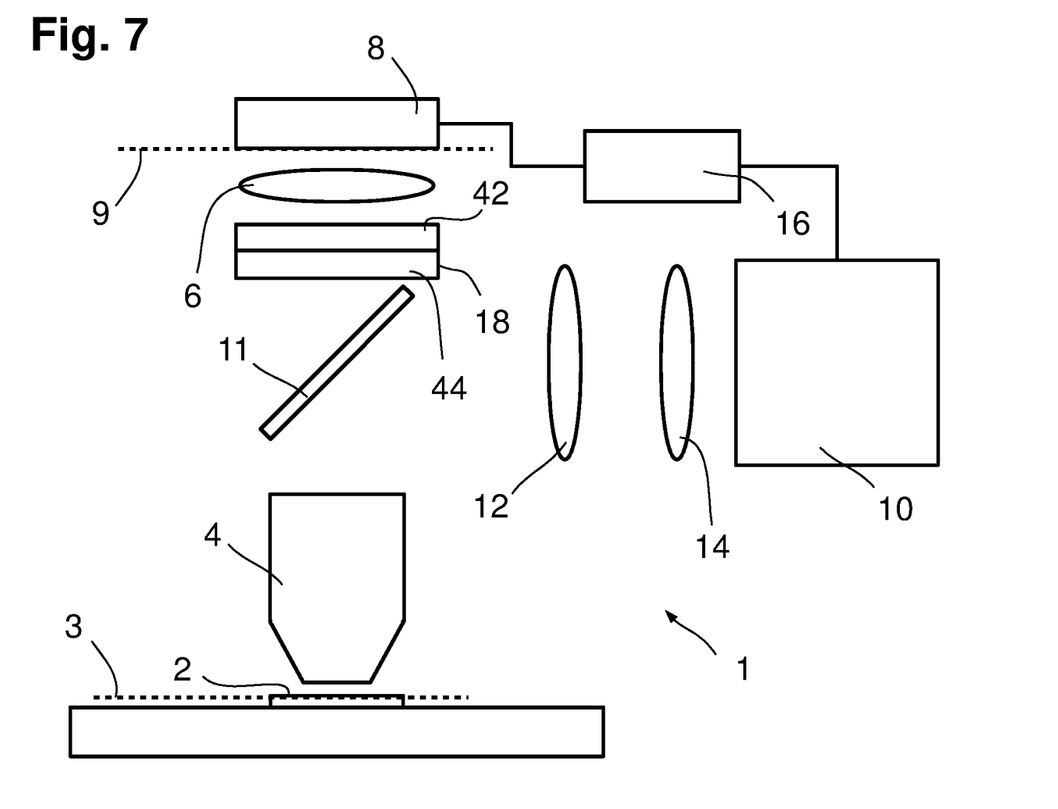
FIG. 7 shows a modified microscope of FIG. 1, wherein the modification concerns the configuration of an optical manipulation element.
Figure 8A:
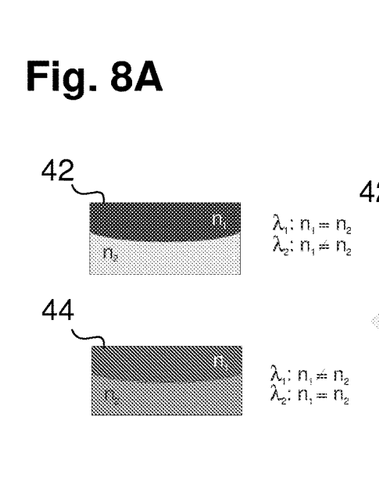
FIGS. 8A to 8C show illustrations corresponding to FIGS. 4A, 4B and 4D, but in this case for the microscope of FIG. 7.
Figures 8B, 8C:
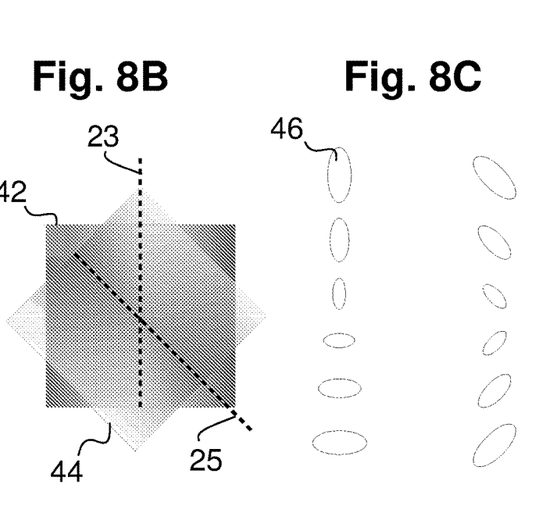

In FIG. 1, the anisotropy element is arranged as a phase-manipulating element in a pupil plane. However, there are also other anisotropic distortions that can be utilized. FIG. 7 shows an embodiment of a microscope 1, in which two anamorphic lens pairs 42 and 44 are used as an optical manipulation element 18. They can be located upstream or downstream of the tube lens 6 or be combined therewith. Their configuration and effect is shown in FIGS. 8A to 8C. As is apparent, the lens pairs 42 and 44 do not act anamorphically for in each case a different neutral wavelength $\lambda_1$ and $\lambda_2$. Further, their cylinder axis in the case of the anamorphic lens pairs 42, 44 being arranged one behind the other is rotated by 45° with respect to one another. The cylinder axis thus again corresponds to the anisotropy axis 23 and 25, respectively. FIG. 8C shows how the distortions differ. The left column of FIG. 8C shows the distortion of the point emitter at the wavelength $\lambda_1$ for different depth locations. In the upper half, the point emitter is situated above the focal plane, in the lower half is located below the focal plane. The right half shows the distortion at the wavelength $\lambda_2$.

The evaluation of the distorted point emitter images is performed in the control device 16.

In the general case of two prisms 26, 28, which are combined to form an Amici prism 22, 24 in accordance with FIG. 2 or 3, at small wedge angles ε for the total deflection, $\delta=(n_1-1)*\varepsilon_1+(n_2-1)*\varepsilon_2=0$, which gives for any desired refractive indices $n_1$ and $n_2>1$ at the neutral wavelength the ratio of the prism wedge angles $\varepsilon_2/\varepsilon_1=-(n_1-1)/(n_2-1)$ and thus a total wedge angle $\varepsilon_1+\varepsilon_2=\varepsilon_1*(1-(n_1-1)/(n_2-1))$. In the special case of the same refractive indices $n_1=n_2$ at the neutral wavelength, $\varepsilon_2/\varepsilon_1=-1$ and thus of the "plane plates" $\varepsilon_1+\varepsilon_2=0$.

On the other hand, it is possible with different dispersion of the two glasses 26, 28, which can be described via different Abbe numbers v1 and v2, to set for the non-neutral wavelength a deflection angle $\delta_\lambda=\varepsilon_1*(n_{2\lambda}-1-(n_{2\lambda}-1)*(n_1-1)/(n_2-1))$, via which the wedge angle(s) ε is/are determined. In this case, $n_{1\lambda}$ and $n_{2\lambda}$ describe the refractive indices of the two materials at the deflection wavelength.

In this way it is possible to design for any desired media cemented prisms that transmit at a neutral wavelength and generate a specific target deflection at another wavelength.

It is also possible to arrange in the z-direction such prisms with different, in particular interchanged, neutral wavelengths.

As shown in FIGS. 6B, 6E and 6H, a third color channel located between the two design wavelengths $\lambda_1$, $\lambda_2$ becomes utilizable due to the "mixing" of the phase effect of the two orthogonally oriented anisotropic elements 22, 24.

However, the principle can also be designed for three design wavelengths by sequential arrangement of three anisotropy elements having different neutral wavelengths $\lambda_1$, $\lambda_2$, $\lambda_3$. It should be noted here that the resulting beam deflections result from the total combination of the other anisotropy elements. Analogously to what was said before, it is possible to combine at least three anisotropy elements from different materials, to which the following conditions apply:

$$\delta(\lambda_1)=0=(n_1(\lambda_1)-1)*\varepsilon_1+(n_2(\lambda_1)-1)*\varepsilon_2+(n_3(\lambda_1)-1)*\varepsilon_3$$

$$\delta(\lambda_2)=0=(n_1(\lambda_2)-1)*\varepsilon_1+(n_2(\lambda_2)-1)*\varepsilon_2+(n_3(\lambda_2)-1)*\varepsilon_3$$

$$\delta(\lambda_3)=\delta=(n_1(\lambda_3)-1)*\varepsilon_1+(n_2(\lambda_3)-1)*\varepsilon_2+(n_3(\lambda_3)-1)*\varepsilon_3$$

wherein δ designates the splitting at the effective wavelength and $\lambda_1$ and $\lambda_2$ designate the neutral wavelengths. For a target effect of the splitting, the three prism angles for suitable media must then be determined.

On the basis of this model, it is possible for example with an SYGH51 wedge angle −0.328°, an S-FTM16 wedge angle +33.158° and an S-NBH51 wedge angle −25.891° to achieve a neutral effect at 546 nm and 643 nm, while the wavelength 480 nm is deflected by 0.2'. A neutral effect at 480 nm and 643 nm can be obtained with the same 0.2' split of 546 nm with an S-YGH51 wedge of −0.303°, an S-FTM16 wedge of −72.384° and an S-NBH51 wedge of 57.548°. The 0.2' split of the 643 nm at neutral wavelengths of 546 nm and 480 nm with an S-YGH51 wedge of 0.644°, an S-FTM16 wedge of 39.269° and an S-NBH51 wedge of −31.701° is analogously conceivable. The short identifiers designate conventional glass types by the manufacturer Ohara.

Furthermore, the azimuthal rotation of the prism units should be reduced from 90° to 60° and taken into account in the PSF calculation.

In a manner similar to how the inclined planes and spot displacements of the wedge pairs are interconnected, these distortions can also be effected radially, which leads to the production of an element and technologically dispenses with the combination of different wedge arrangements in the (divided) pupil. This can initially, analogously to FIG. 2, result in a monochromatic spiral mask on a substrate. The combination of two such structures on different materials which are cemented together on a common plane side can then produce a similar neutral wavelength in the overall effect as the partial prisons cemented to form the Amici prism. The sequential arrangement of such units with different neutral wavelength then again permits an effect of the phase structures that is separated with respect to wavelength. In principle, it is thus possible to realize a wide variety of chromatic phase masks for different applications.

The 3D localization of the isolated, that is to say separated, emitters is effected based on experimentally ascertained or simulated PSF. In principle, it is also possible to use algorithms that evaluate specific parameters of the PSF (see S. Pavani et al., "Three-dimensional, single-molecule fluorescence imaging beyond the diffraction limit by using a double-helix point spread function," Proceedings of the National Academy of Sciences, 106.9 (2009): 2995-2999). The use of the previously measured 3D PSF has the advantage that system-induced aberrations can also be taken into account and that the PSF in the further defocused regions where individual parameters between the different color PSFs can no longer be uniquely separated can still be used.

3D localization of the separated emitters can be effected advantageously by adapting an experimentally determined or simulated 3D PSF, typically by a maximum likelihood estimation algorithm, as in M. Juette, et al., Nature Methods, Vol. 5, No. 6, p. 527, June 2008, and the associated supplementary material, or in Li, Yiming, et al. "Fast, robust and precise 3D localization for arbitrary point spread functions." bioRxiv (2017): 172643.

The method is optionally also usable for the 2D imaging, for example under TIRF illumination or in the case of very thin samples. In that case, only the color coding of the PSF form in the focus is utilized (cf. FIG. 6, center line), and this is even more unique and unambiguous than in the 3D case.

The invention claimed is:

1. A localization microscope, comprising:
    an imaging device for imaging a sample, which emits sample light from a focal plane into an image plane, wherein the imaging device comprises an optical manipulation device that is configured for a depth-dependent influencing of a point spread function of the imaging and influences the point spread function of the imaging such that a point emitter is imaged in the image plane into a point emitter image that is rotationally asymmetrically distorted,
    wherein at least one of form and orientation of the rotationally asymmetric distortion of the point emitter image depend on a location of the point emitter with respect to the focal plane and a wavelength of the sample light, and
    wherein the optical manipulation device comprises a first and a second anisotropy element that anisotropically influence in each case the point spread function of the imaging to produce rotational asymmetry of the point emitter image and in each case comprise an anisotropy axis, and
    wherein:
    the two anisotropy elements are arranged one behind the other in an imaging direction and their anisotropy axes are located at an angle with respect to one another,
    both anisotropy elements have a neutral wavelength at which they do not anisotropically influence the point spread function of the imaging, and
    the neutral wavelengths differ.

2. The localization microscope as claimed in claim 1, wherein the anisotropy elements are formed as a phase element which has a phase-influencing effect at the neutral wavelength of the other anisotropy element and does not have one at the neutral wavelength.

3. The localization microscope as claimed in claim 2, wherein each phase element is embodied as a wedge pair made from two glasses with different dispersion properties, wherein refractive indices and wedge angles are selected such that a wedge angle pair at the neutral wavelength produces direct vision, and otherwise not.

4. The localization microscope as claimed in claim 1, wherein the anisotropy axes are situated at an angle of between 80 and 100 degrees with respect to one another.

5. The localization microscope of claim 4, wherein the anisotropy axes are situated at an angle of 90 degrees with respect to one another.

6. The localization microscope as claimed in claim 1, wherein the anisotropy elements are embodied in each form as an anamorphic lens that has no cylinder effect at the neutral wavelength.

7. The localization microscope as claimed in claim 6, wherein the anisotropy axes are situated at an angle of between 35 and 55 degrees with respect to one another.

8. The localization microscope as claimed in claim 7, wherein the anisotropy axes are situated at an angle of 45 degrees with respect to one another.

9. A method for localization microscopy, comprising:
    emitting sample light from a sample and imaging the sample from a focal plane into an image plane,
    influencing a point spread function of the imaging in a depth-dependent fashion using an optical manipulation device such that a point emitter is imaged in the image plane into a point emitter image that is rotationally asymmetrically distorted, wherein at least one of form and orientation of the rotationally asymmetric distortion of the point emitter image depend on a location of the point emitter with respect to the focal plane and a wavelength of the sample light, and
    using a first and a second anisotropy element in the optical manipulation device to anisotropically influence a point spread function of the imaging to produce rotational asymmetry of the point emitter image, each of the first and the second anisotropy elements comprising an anisotropy axis, and wherein:

the first and the second anisotropy elements are arranged one behind the other in an imaging direction and with their respective anisotropy axes at an angle with respect to one another, and both the first and the second anisotropy elements have a neutral wavelength at which they do not anisotropically influence the point spread function of the imaging, and the neutral wavelengths differ from one another.

10. The method as claimed in claim 9, further comprising using, for each anisotropy element, a phase element which has a phase-influencing effect at the neutral wavelength of the other anisotropy element and does not have one at the neutral wavelength.

11. The method as claimed in claim 10, further comprising using, for each phase element, a wedge pair made from two glasses with different dispersion properties, including selecting refractive indices and wedge angles such that a wedge angle pair at the neutral wavelength produces direct vision, and otherwise not.

12. The method as claimed in claim 10, wherein the anisotropy axes are situated at an angle of between 80 and 100 degrees with respect to one another.

13. The method as claimed in claim 12, wherein the anisotropy axes are situated at an angle of 90 degrees with respect to one another.

14. The method as claimed in claim 11, further comprising using, for each anisotropy element, an anamorphic lens that has no cylinder effect at the neutral wavelength.

15. The method as claimed in claim 14, wherein the anisotropy axes are situated at an angle of between 35 and 55 degrees with respect to one another.

16. The method as claimed in claim 15, wherein the anisotropy axes are situated at an angle of 45 degrees with respect to one another.

* * * * *

UNITED STATES PATENT AND TRADEMARK OFFICE
CERTIFICATE OF CORRECTION

PATENT NO.           : 11,308,688 B2
APPLICATION NO.      : 16/573869
DATED                : April 19, 2022
INVENTOR(S)          : Thomas Kalkbrenner and Michael Goelles It is certified that error appears in the above-identified patent and that said Letters Patent is hereby corrected as shown below:

In the Specification

At Column 10, Lines 40-41, delete "$\delta_\lambda = \varepsilon_1 *(n_{2\lambda}-1-(n_{2\lambda}-1)*(n_1-1)/(n_2-1))$" and insert -- $\delta_\lambda=\varepsilon_1*(n_{1\lambda}-1-(n_{2\lambda}-1)*(n_1-1)/(n_2-1))$ --, therefor.

Signed and Sealed this
Twenty-third Day of August, 2022

Katherine Kelly Vidal
*Director of the United States Patent and Trademark Office*